Sept. 15, 1953 F. G. NEGRI 2,652,285
ROLLER SKATE WHEEL
Filed July 10, 1950
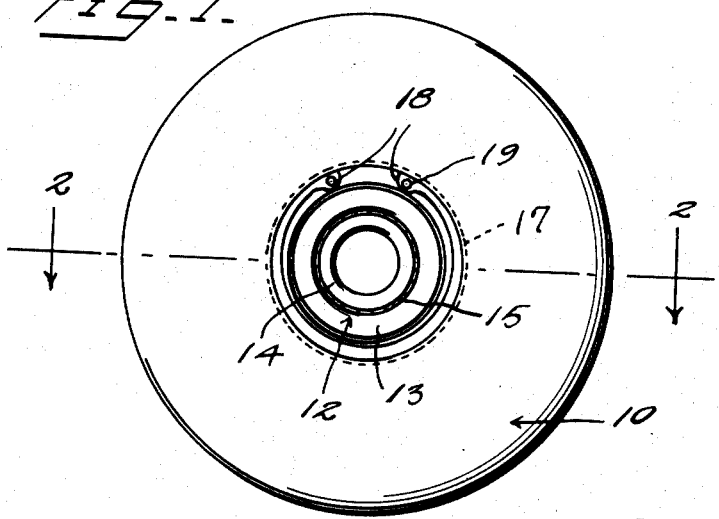
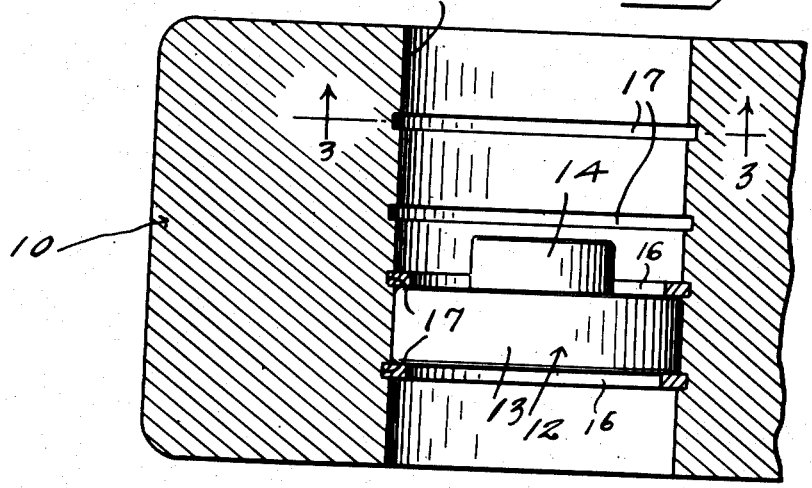
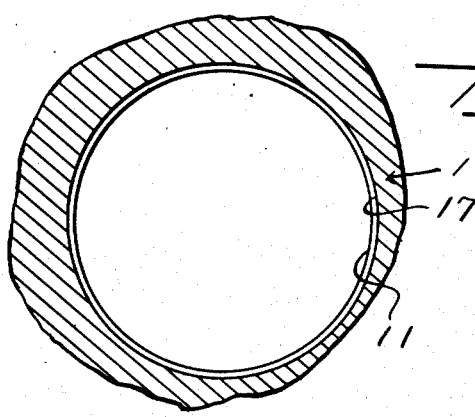
INVENTOR
Frank G. Negri
BY
Kennel & Crowell
ATTORNEYS Patented Sept. 15, 1953

2,652,285

UNITED STATES PATENT OFFICE 2,652,285

ROLLER SKATE WHEEL

Frank G. Negri, Jamaica, N. Y., assignor to Noel Precision Corporation, Jamaica, N. Y.

Application July 10, 1950, Serial No. 172,991

1 Claim. (Cl. 301—5.7)

This invention relates to a roller skate wheel.

An object of this invention is to provide a roller skate wheel with an anti-friction bearing, and an improved means for securing the bearing in the wheel.

Another object of this invention is to provide a roller skate wheel which may be made out of wood, fiber or other composition material, such as plastic or the like, with an anti-friction bearing, and means for removably locking the bearing in the wheel, so that if the wheel should be broken or damaged, the bearing may be readily mounted in a new wheel.

A further object of this invention is to produce a roller skate wheel which can be made at relatively low cost with the anti-friction bearing locked within the bore in the wheel body without the use of a metal sleeve or lining.

With the above and other objects in view, my invention consists in the arrangement, combination and details of construction disclosed in the drawings and specification, and then more particularly pointed out in the appended claim.

In the drawings:

Figure 1 is a detail end elevation of a roller skate wheel constructed according to an embodiment of this invention.

Figure 2 is a fragmentary sectional view taken on the line 2—2 of Figure 1.

Figure 3 is a fragmentary sectional view taken on the line 3—3 of Figure 2.

Referring to the drawing, the numeral 10 designates generally a wheel body of circular form which may be formed out of wood, fiber, or composition material, such as plastic or the like. The wheel body 10 is formed with a centrally disposed bore 11 extending therethrough within which an anti-friction bearing member 12 is adapted to be removably secured. The anti-friction member 12 comprises an outer race 13, an inner race 14, and interposed balls 15. The outer race 13 is adapted to snugly engage within the bore 11 of wheel 10 and is secured in endwise adjusted position by means of a pair of split locking rings 16. The split resilient rings 16 engage in annular grooves or keepers 17 formed in the bore 11 and, as shown in Figure 2, there are several pairs of the annular grooves or keepers 17 disposed interiorly of the bore 11 so that the bearing 12 may be positioned in selected positions within the length of the bore 11.

The locking ring 16 is formed of resilient flat material and is provided with enlarged lugs 18 at the ends thereof which have holes 19 for the reception of a locking ring contracting tool in order that the locking rings 16 may be contracted sufficiently to pass into the bore 11 and abut against an end of the outer bearing race 13.

With a construction as hereinbefore described where the wheel body 10 wears down unduly at one end or side thereof, the wheel body may be reversed with respect to the bearing 12, or the bearing 12 may be removed from the wheel body 10 and reinserted into a new wheel body 10. Preferably the wheel body 10 is formed out of wood which upon wearing down, cracking or becoming otherwise damaged may be easily and quickly replaced. While there are disposed two pairs of annular grooves or keepers 17 in the bore 11, it will be understood that there may be as many of these grooves 17 as may be desired so that the anti-friction bearing 12 may be adjustably secured at any selected endwise position with respect to the bore 12.

What is claimed is:

A roller skate wheel comprising a reversible wheel body having inner and outer axial portions and a central bore provided with pairs of spaced annular internal grooves, one pair being in each axial portion, an anti-friction bearing of a diameter to fit tightly within said bore and of a thickness equal to the distance between said grooves of each pair, and a pair of resilient split locking rings, each adapted for engagement in a groove on opposite sides of said bearing, each ring being provided with tool engaging apertures at the ends thereof whereby the rings may be contracted to insert or remove the same, whereby the wheel body may be reversed on the anti-friction bearing.

FRANK G. NEGRI.

References Cited in the file of this patent

UNITED STATES PATENTS

| Number | Name | Date |
|---|---|---|
| 876,836 | Plimpton | Jan. 14, 1908 |
| 2,162,696 | Burger | June 20, 1939 |
| 2,405,122 | Firth | Aug. 6, 1946 |
| 2,510,659 | Ristow | June 6, 1950 |
| 2,552,035 | Cooke | May 8, 1951 |

FOREIGN PATENTS

| Number | Country | Date |
|---|---|---|
| 785,957 | France | Aug. 23, 1935 |